Patented Jan. 31, 1928.

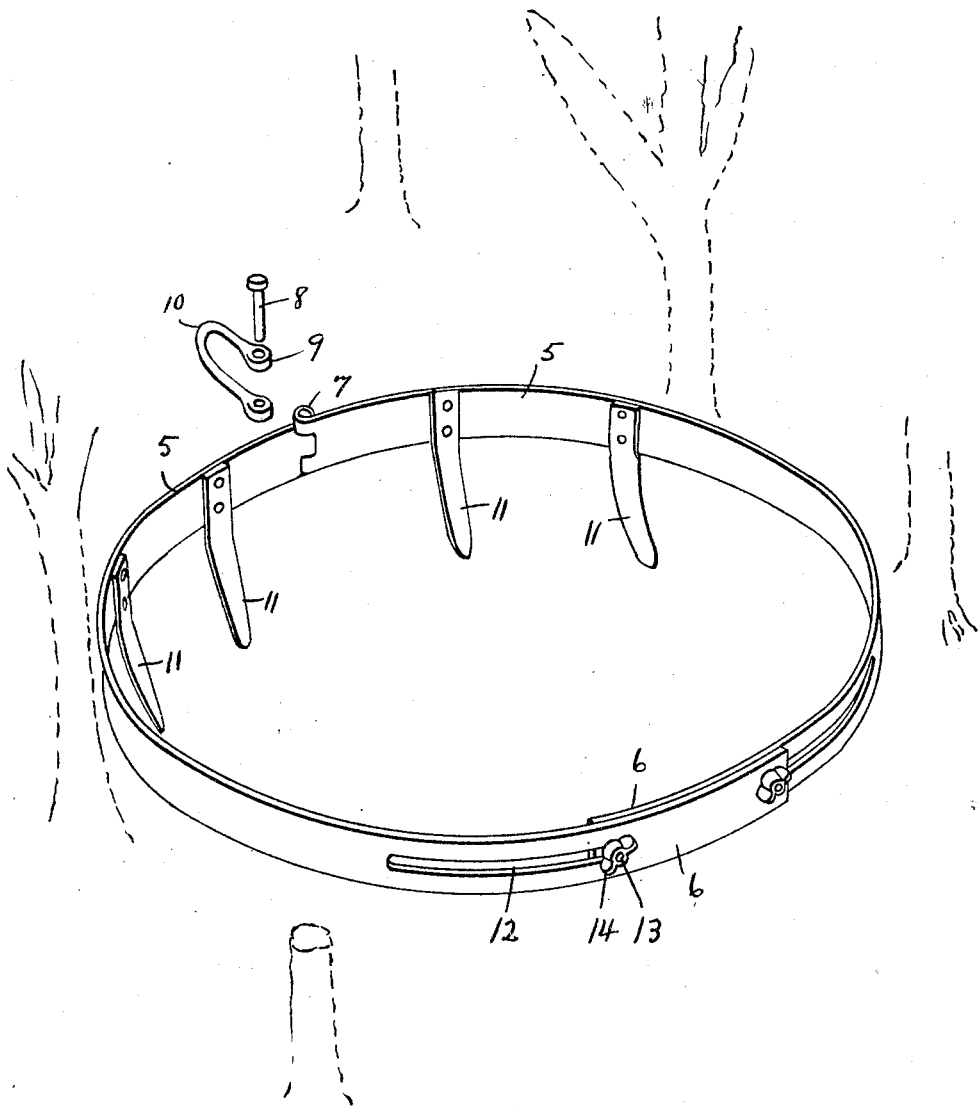

1,657,518

UNITED STATES PATENT OFFICE.

MELVIN LAWRENCE RICKARD, OF CAMBRIDGE, NEBRASKA.

RIDGE SMOOTHER.

Application filed March 17, 1927. Serial No. 176,072.

The present invention relates generally to agricultural implements and more particularly to one of the harrow type, in the form of a ridge smoother, adapted to be used in conjunction with a cultivator to be dragged behind the same.

An important object of the invention is to provide, in a manner as hereinafter set forth, a ground working machine of such class, having an expansible and contractible body portion provided with teeth and further including means co-acting with the body portion for the purpose of increasing or decreasing the width of the track of the ridge smoother to provide for the satisfactory working of the machine between rows of different widths.

Further objects of the invention are to provide a ridge smoother, in a manner as hereinafter set forth, which is simple in its construction and arrangement, adjustable, strong, durable, compact, thoroughly efficient and convenient in its use, readily assembled, and comparatively inexpensive to manufacture.

With the foregoing and other objects in view, the invention consists in the novel construction, combination, and arrangement of parts as hereinafter more specifically described and illustrated in the accompanying drawing, wherein is shown an embodiment of the invention which it is to be understood that changes, variations, and modifications can be resorted to, which come within the scope of the invention as claimed hereinafter.

In the drawings, wherein like reference characters denote corresponding parts throughout the several views:

The figure is a perspective view of the device embodying the features of this invention.

Referring to the drawings in detail, it will be seen that the body of the ridge smoother includes a pair of semi-circular sections 5, having overlapping ends 6. The other ends are provided with registering sleeve portions 7 for receiving a hinge pin 8, which is also insertible through eyes 9 of a clevis 10. Teeth 11 project downwardly from the sections 5 adjacent the hinged ends thereof. The overlapping ends 6 are provided with longitudinal slots 12. Bolts 13 extend transversely from the extremities of the ends 6 and pass through the slots 12 and have wing nuts 14 thereon, so that the sections 5 may be adjusted in relation to each other, to increase the size or decrease the size of the body, depending upon the width of the row.

In actual practice, this ridge smoother or drag has proven very useful as a moisture saver and leaves the ground in a very level condition for the next operation. The device is hitched behind a cultivator after the first time over the ground and it will leave the ground in fine shape for as many times thereafter as it is used. As is well known it is unnecessary to ridge corn very high. This device will fill up all the center shovel back, with loose dirt, thereby retaining the moisture.

It is thought that the construction, operation, and advantages of this invention will now be quite apparent to those skilled in this art without a more detailed description thereof.

The present embodiment of the invention has been disclosed by way of example, because in actual practice it attains the features of advantage and numerous others as mentioned above.

Having thus described my invention, what I claim as new is:

1. An agricultural implement of the class described, comprising a pair of arcuate sections hinged together at one end and the other ends in overlapping relation, said overlapping ends being provided with longitudinal slots, bolts projecting from the extremities of said overlapping ends through the slots, nuts on the bolts, and a plurality of teeth projecting downwardly from the sections adjacent the hinged ends thereof.

2. An agricultural implement of the class described comprising a pair of arcuate sections hinged together at one end and the other ends being in overlapping relation, said overlapping ends being provided with longitudinal slots, bolts projecting through the extremities of said overlapping ends through the slots, nuts on the bolts, and ground engaging and working means on the sections.

3. An agricultural implement of the class described comprising a pair of arcuate sections hinged together at one end, the other ends being in overlapping relation, means for adjusting the overlapping ends in respect to each other, ground engaging and working means on the sections, a hinge pin at the hinged ends of the sections, and a clevis engaged on said hinge pin.

In testimony whereof I affix my signature.

MELVIN LAWRENCE RICKARD.